Jan. 11, 1949.                L. HANOPOL                2,458,993
                              TESTING SOCKET

Filed Jan. 27, 1945                                3 Sheets-Sheet 1

Inventor
Louis Hanopol
By Ezekiel Wolf
His Attorney

Jan. 11, 1949.   L. HANOPOL   2,458,993
TESTING SOCKET
Filed Jan. 27, 1945   3 Sheets-Sheet 2

Inventor
Louis Hanopol
By Ezekiel Wolf
His Attorney

Jan. 11, 1949.    L. HANOPOL    2,458,993
TESTING SOCKET
Filed Jan. 27, 1945    3 Sheets-Sheet 3

Inventor
Louis Hanopol
By Ezekiel Wolf
His Attorney.

Patented Jan. 11, 1949

2,458,993

UNITED STATES PATENT OFFICE 2,458,993

TESTING SOCKET

Louis Hanopol, Jamaica Plain, Mass., assignor to A. L. Deutschmann, Arnold Deutschmann, L. Deutschmann, and Herbert W. Gordon, doing business as Technical Apparatus Company, Roxbury, Mass.

Application January 27, 1945, Serial No. 574,952

9 Claims. (Cl. 174—35)

The present invention relates to a testing socket for testing vacuum and other electronic tubes and is particularly useful for making measurements of inter-electrode capacities in such electronic tubes. For this purpose it is highly essential to shield the connecting leads from the tube pins to the tube socket and to the test instrument or meter upon which the readings are being taken. All tubes which are tested should have their sockets completely shielded and necessary connections should be readily made. Since tubes are of all sizes, it would be necessary under normal conditions to use a great many test sockets. The present invention aims to overcome this difficulty by providing a device which is adaptable for tubes of various types and sizes and which at all times will effect a complete shielding of the tube connections from their very terminal pins.

The present invention comprises a comparatively heavy base element through which connections from the testing circuit may be made to the tube sockets. The arrangements of the parts and methods and purposes of operation will be more readily understood in connection with the embodiment of the invention described in the specification below when read with the drawings in which—

Figure 1:
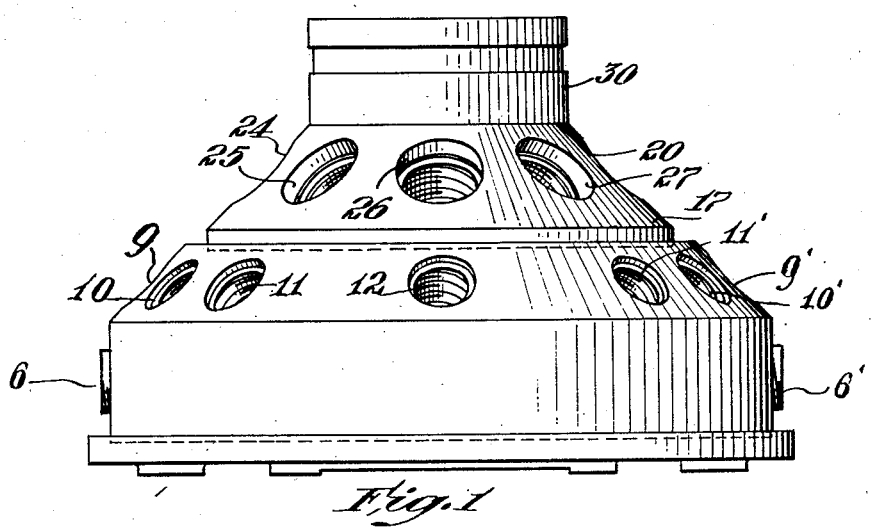
Figure 1 shows the invention in elevation without cable connections.

In the arrangement in the drawings the device may be mounted on a base plate 1 which may be fastened to a bench, table, panel or other means through the mounting holes 2 in a mounting flange 3 formed as an extension of the base. The shielded junction block, which provides the lower shielded sectional compartments 4', 4" and 4''', is mounted on the base plate 1 by means of a group of machine screws 4 which thread into the edge of the wall section 5 of the connector junction block. All the walls of the junction block, as the wall 5 and the supporting plate 1, must be made of metal and held together through mounted screws with good electrical contact between the plate and base section. The wall 5 of the junction block is cylindrical in shape and has a receptacle 6 positioned in its upwardly extending wall for receiving a plug connector cable not shown in the drawing. Other receptacles 7, 8, 9, 10 and 11 are spaced in the inclined sides of the extending wall 5 within the shielded chamber 4' in which receptacle receiving connecting plugs may be inserted. A similar set of receptacles are preferably mounted on the other side of the base member 5 shielded in the compartment 4''' from the first mentioned group. These comprise a receptacle 6' corresponding to 6 in the cylindrical wall of the block 5 and receptacles 7', 8', 9', 10' and 11' in the sloped walls of the base 5 corresponding to the receptacles 7, 8, 9, 10 and 11. The receptacles 6 and 6' are internally connected to the other receptacles 7, 8, 9, 10 and 11 and 7', 8', 9', 10' and 11' respectively in the sloped sides of the base so that each set of receptacles will be energized either from the receptacles 6 or 6' respectively. Two other side receptacles 12 and 12' are also positioned in the inclined walls of the base 5 in the centrally positioned shielded compartment 4" and are connected to the terminals of the condenser 13 mounted in the center of this section. This compartment is separated from the side compartments by the metallic partitions 14 and 15.

There is attached to the metallic top 16 of the base block 5, by means of screws 18, a second receptacle section 17 which also has inclined sides in which are recessed the electrical connecting receptacles 20, 21, 22, 23, 24, 25, 26 and 27. The top flat part 19 of this section is also provided with rectacles 28 (Figure 5) arranged around the flat part 19 of the section 17. For each receptacle 20 to 27 inclusive there is a corresponding receptacle 28 which is internally connected as by lead 29 to a corresponding receptacle as, for instance, 20. The receptacles on the face 19 and the receptacles on the inclined sides are arranged similarly and preferably symmetrically with the vertical axis of the device so that when an external connection is made to the receptacles or sockets in the inclined sides of the plate 17, the operator knows that the corresponding receptacle on the flat surface 19 is connected to it. The receptacle or sockets 28 are all alike and are adapted to receive the plugs or prongs in the top adapter sections 30 of which one or several may be furnished with each device.

Figure 7:
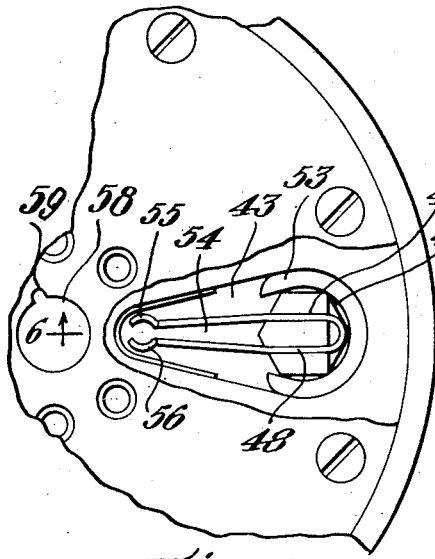
Figure 7 shows a plan view of the element shown in Figure 6 with an element partly removed.
Figure 6:
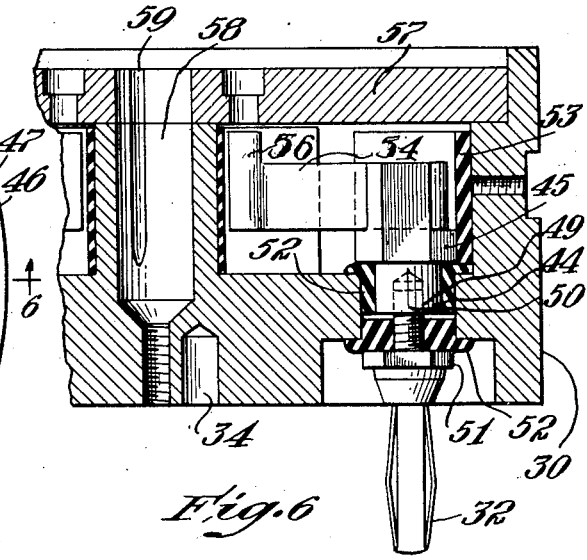
Figure 6 shows a fragmentary sectional view of the top adaptor taken on the line 6—6 of Figure 7.
Figure 5:
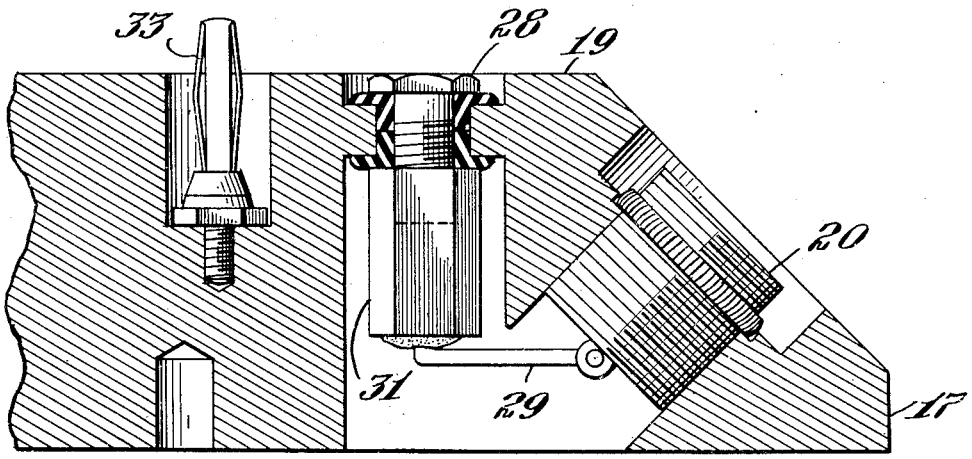
Figure 5 shows an enlarged sectional view of the section of the device just below the top substantially on the line 5—5 of Figure 2.

The construction of these elements just mentioned is shown in Figures 5, 6 and 7. The receptacles 28 may be of usual construction with a member 31 recessed to receive the prongs or plug 32 projecting from the connector in the top section 30. The member 31 is preferably made in two parts, the receptacle 28 screwing into the base forming externally a clamping flange insulated by a clamping collar, by means of which the top of the receptacle 28 is held flush in the top surface 19 of the plate 17. A guide pin or plug 33 offset from the center of the plate 17 may be provided for aligning the top section 30 with the plate 17, the section 30 being provided with a corresponding aligning hole 34.

The top section 30 is provided on its top surface with sockets or receptacles 35, 36, 37, 38, 39, 40, 41 and 42 which are aligned with the receptacles 20 to 27 inclusive and which are correspondingly connected through the plugs 32 at the bottom of the section 30 and the sockets 28 in the surface 19 of the section 17.

The construction of connecting electrical elements between the plugs 32 and the receptacles 35 to 42 is shown in Figures 6 and 7. The plate 30 is recessed at the top at 43 in a wedged shaped sector arched on the outer side by a circle of larger diameter than on its inner side. At the larger side a cylindrical hole 44' passes through the plate 30 and in this is positioned a post member 44 with a hexagonal top section 45 which is partially cut away at the outer side at 46 and slotted with two slots 47 and 48, the slots running generally toward the symmetrical center of the plate 30 but preferably parallel to each other. This post member 44 is tapped at the bottom at 49 to receive the screw 50 extending from the flange 51 on which the prongs or plug 32 is mounted. Since the section 45 of the post member 44 is larger than the part of the post member 44 in the hole through the plate 30, the post member 44 will be clamped in place when the unit is assembled. The post member 44 is insulated from the plate 30 at the bottom by the insulating washer 52 resting on the flange 51, in the hole and on the base of the recess by the collar 52 which is provided with a flange on which the bottom of the section 45 rests, and around the walls of the wedge sector 43 by the insulating curved sheet 53 which rests against the sides of the top section 45.

In the slots 47 and 48 is mounted a pronged connecting member 54 of spring conducting metal with the prongs extending toward the center of the plate 30. The ends of the prongs carry upwardly extending arms 55 and 56 formed as segments of cylinders adapted to receive the tube pins which fit into them.

The top of the section 30 is provided with an upwardly extending rim to hold the shield cover 57 drilled with holes to fit over and be aligned with the connecting receptacles and serve as a guide to permit the pins of the tubes to go into the correct connections. At the center of the plate 30 there may be provided a centering hole 58 with a keyway 59 into which the centering pin of the tubes tested will be guided.

Figure 2:
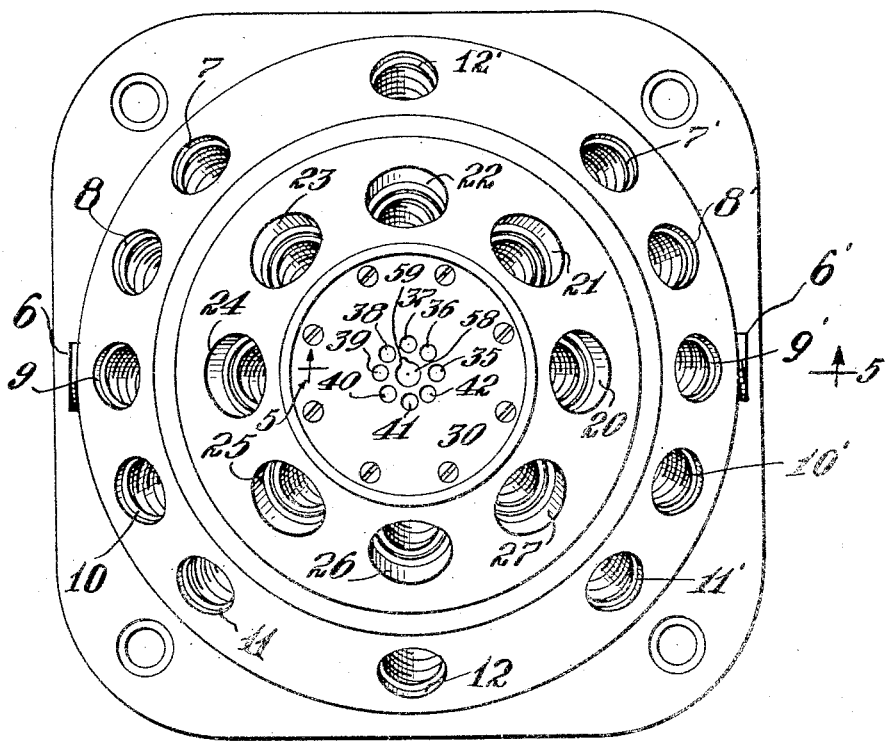
Figure 2 shows a top plan view of the device of Figure 1.
Figure 4:
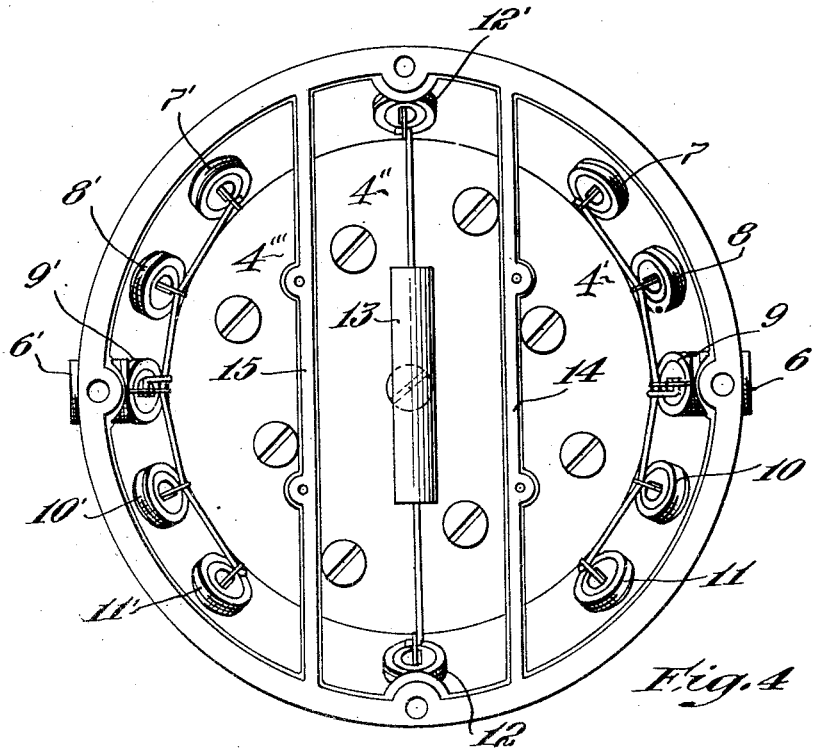
Figure 4 shows a view of the base looking upward as viewed in Figure 3.
Figure 3:
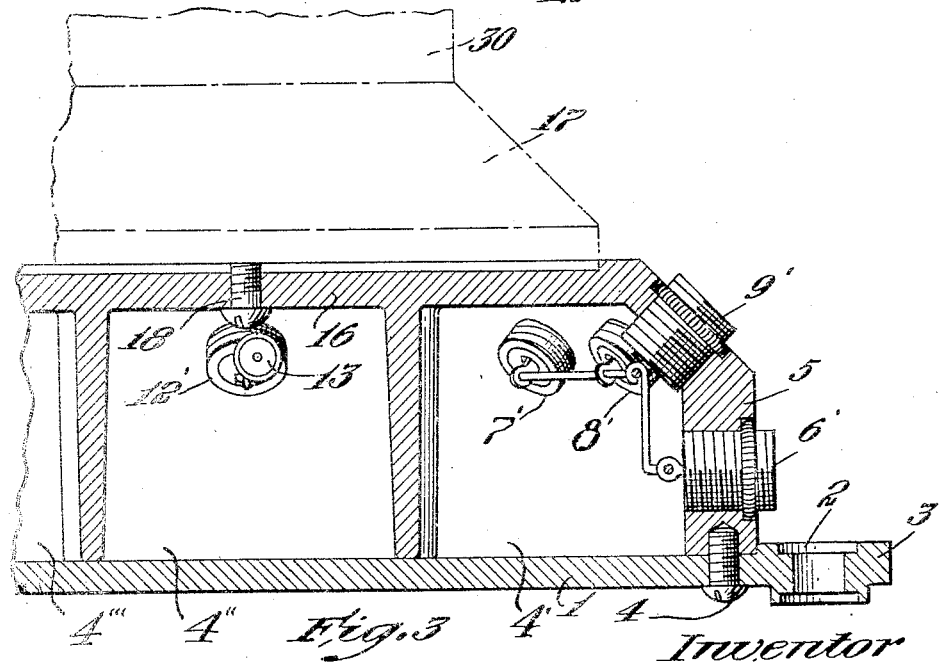
Figure 3 shows an elevation of the lower part of the invention with parts in fragmentary section.

In the operation of the device, the tube to be tested when placed in its socket has its base pins connected to the receptacles 20 to 27 inclusive. The receptacles 20 to 27 inclusive provide means for making individual connections to the groups of receptacles in the base block 5 which are made up of three groups 6 to 11 inclusive, 6' to 11' inclusive, and 12, 12'. The receptacles 6 to 11 inclusive and 6' to 11' inclusive are paralleled together in groups while the receptacles 12 and 12' are the terminals of the condenser 13. A coaxial shielded cable from a vacuum tube voltmeter, for instance, may plug into the receptacle 6 while a similar cable from a tube oscillator may be plugged into the receptacle 6'. The ordinary type patch shielded cables may be used for this purpose. Coaxial patch cords are also used to connect the receptacles 6 to 11, 6' to 11' and 12 and 12' to the receptacles 20 to 27 inclusive in any manner as may be desired. Any number of receptacles may be used as required, the tube socket in the top of the plate 30 being provided with eight separate receptacles to receive the pins of the tube to be tested. The top plate 30 shows in Figure 2 as a small tube socket. As has been stated, one or more tube adapters 30 may be furnished with the test socket of different sizes to take all kinds of tubes.

This test socket provides an entirely shielded device for the tubes since it is of metal and all connecting leads are of the coaxial shielded patch cable type.

Having now described my invention, I claim:

1. A shielded test socket device comprising a metal base junction block section, an intermediate metal socket section and a metal top adapter section, said base section providing a plurality of parallel shielded receptacle connections, said intermediate section having a top surface with a plurality of shielded sockets internally connected respectively to a plurality of receptacles positioned in an inclined peripheral surface of said intermediate section, said top adapter section having on its bottom surface plugs aligned to fit into the sockets in the top surface of the intermediate section and a socke having pin receptacles in the top surface of the top section adapted to receive the tube to be tested, the socket in the top section having its pin receptacles connected internally one to each of the plugs in the bottom of the top section.

2. In a shielded test socket device, a plurality of plate-like metal sections adapted to fit one on the other, the top section comprising an adapter having a socket with pin receptacles corresponding to the tubes to be tested conneced to plugs at the bottom of said adapter fitting into sockets in the surface of the section under the top section, said section under the top having peripheral sockets connected internally one to each of said sockets in the surface.

3. In a shielded test socket device, a plurality of metal plate-like sections adapted to fit one on the other, the top section comprising an adapter having a socket with pin receptacles corresponding to the tubes to be tested and plug members at the bottom thereof fitting into sockets in the surface of the section under the top section, said section under the top having peripheral sockets connected internally one to each of said sockets in the surface and said plugs connected one to each of the pin receptacles in the top section, the adapter having its plugs spaced around a larger circumference than the pin receptacle, with each arranged in the same symmetrical pattern.

4. A shielded test socket device made up of three metal sections, two having peripheral surfaces inclined to the planes of the sections, said sections being parallel to one another with the lower section having electrical connection receptacles positioned around the peripheral surface, the intermediate section having electrical connection receptacles positioned around the peripheral surface and a plurality of receptacles in the top surface of the intermediate section connected respectively to those in its peripheral surface, the third top section having plug members on the bottom face of the top section positioned thereon in a manner to conform to the sockets in the top surface of the intermediate sections and to make electrical connections therewith, said top section having on the top surface thereof pin receptacles of a socket arranged to conform and to receive the prongs of the tubes to be tested.

5. A shielded test socket device made up of three metal sections, two having peripheral surfaces inclined to the planes of the sections, said sections being parallel to one another with the lower section having electrical connection receptacles positioned around the peripheral surface, the intermediate section having electrical connection receptacles positioned around the peripheral surface and a plurality of receptacles in the top surface of the intermediate section connected respectively to those in its peripheral surface, the third top section having plug members on the bottom face of the top section positioned thereon in a manner to conform to the sockets in the top surface of the intermediate sections and to make electrical connections therewith, said top section having on the top surface thereof pin receptacles of a socket element arranged to conform and to receive the prongs of the tubes to be tested, the sockets in the surface of the intermediate section and those in the periphery of the intermediate section positioned in radial alignment in pairs and internally electrically connected together.

6. In a shielded test socket device, a pair of metal plate members having engaging plugs and sockets in adjacent parallel surfaces, a plurality of peripheral socket elements each aligned with the engaging socket and plug members and internally electrically connected to said engaging socket.

7. A shielded test socket device comprising a plurality of metal sections, one section having a plurality of shielded compartments with electrical receptacles connected in parallel to a single receptacle, another section having a shielded compartment with adjacent externally and internally positioned receptacles connected together and a third section having a tube socket with electrical pin receiving members and plug members connected thereto adapted to fit into said internally positioned receptacle.

8. A shielded test socket device comprising a metal plate providing a tube socket with pin receiving members, means providing a plurality of sets of electrical receptacles, means connecting one such set to said pin receiving members, means interconnecting two other sets, and means insulating each set from the other whereby any pin may be connected with any receptacle.

9. In a shielded test socket device, an adapter section having a plurality of spaced connector elements mounted therein providing interconnected electrical connecting elements on either side of said adapter section, the connection elements on the one side being arranged in closer spacing than those on the other side, said connector elements comprising a metal supporting bar mounted in said adapter having an electrical connector element at its lower end and a pronged pin receiving element secured in slots in the top of said bar, and means insulatingly supporting said bar in said adapter.

LOUIS HANOPOL.

REFERENCES CITED

The following references are of record in the file of this patent:

UNITED STATES PATENTS

| Number | Name | Date |
| --- | --- | --- |
| Re. 20,162 | Draving | Nov. 10, 1936 |
| 1,717,836 | Conner | June 18, 1929 |
| 1,758,166 | Miller | May 13, 1930 |
| 1,960,579 | Edwards | May 29, 1934 |

FOREIGN PATENTS

| Number | Country | Date |
| --- | --- | --- |
| 383,522 | Great Britain | Nov. 17, 1932 |
| 521,072 | France | Feb. 26, 1921 |